United States Patent
Ueki

(10) Patent No.: US 8,505,503 B2
(45) Date of Patent: Aug. 13, 2013

(54) INTERNAL COMBUSTION ENGINE AND METHOD OF PRODUCING THE SAME

(76) Inventor: Kaneyuki Ueki, Oita (JP)

(*) Notice: Subject to any disclaimer, the term of this patent is extended or adjusted under 35 U.S.C. 154(b) by 0 days.

(21) Appl. No.: 13/481,200

(22) Filed: May 25, 2012

(65) Prior Publication Data

US 2012/0234293 A1    Sep. 20, 2012

Related U.S. Application Data

(63) Continuation of application No. PCT/JP2010/068904, filed on Oct. 26, 2010.

(30) Foreign Application Priority Data

Dec. 1, 2009   (JP) ................................. 2009-273771

(51) Int. Cl.
*F02B 25/00* (2006.01)
*F02D 13/02* (2006.01)

(52) U.S. Cl.
USPC .................................... 123/65 PE; 123/74 B

(58) Field of Classification Search
USPC ............. 123/73 R, 73 A, 73 AC, 73 D, 73 V, 123/73 SC, 73 PP, 74 A, 74 B, 65 PE, 65 A, 123/568.13, 568.14
See application file for complete search history.

(56) References Cited

U.S. PATENT DOCUMENTS

| 3,817,227 | A | * | 6/1974 | Onishi | 123/73 A |
| 4,180,029 | A | * | 12/1979 | Onishi | 123/73 A |
| 4,911,115 | A | * | 3/1990 | Boyesen | 123/65 PE |
| 7,152,557 | B2 | * | 12/2006 | Forbush | 123/65 PE |

FOREIGN PATENT DOCUMENTS

| JP | 01-093331 U | 6/1989 |
| JP | 05-078916 U | 10/1993 |
| JP | 2002-227652 | 8/2002 |
| JP | 2005-233087 | 9/2005 |

* cited by examiner

*Primary Examiner* — Mahmoud Gimie
(74) *Attorney, Agent, or Firm* — Kubotera & Associates LLC

(57) ABSTRACT

An internal combustion engine includes a cylinder chamber having a cylinder gas inlet and a cylinder gas outlet; an adjustment plate attached to the cylinder gas outlet; an exhaustion pipe attached to the cylinder gas outlet with the adjustment plate in between; and a piston disposed inside the cylinder chamber. The adjustment plate has a through hole having an opening area smaller than that of the air cylinder gas outlet. The adjustment plate is attached to the cylinder gas outlet so that a lower edge of the through hole is situated at a higher position relative to a lower edge of the cylinder gas outlet. The piston is disposed inside the cylinder chamber so that an upper end surface of the piston is situated at a higher position relative to the lower edge of the cylinder gas outlet when the piston is situated at a bottom dead point.

8 Claims, 4 Drawing Sheets

INTERNAL COMBUSTION ENGINE AND METHOD OF PRODUCING THE SAME

CROSS-REFERENCE TO RELATED APPLICATIONS

This is a continuation application of the prior PCT application PCT/JP2010/068904, filed on Oct. 26, 2010, pending, which claims priority from a Japanese patent application No. 2009-273771, filed on Dec. 1, 2009, the entire content of which is incorporated herein by reference.

BACKGROUND OF THE INVENTION AND RELATED ART STATEMENT

The present invention relates to an internal combustion engine and a method of producing the internal combustion engine.

Conventionally, an internal combustion engine with a small size and a high output has been used in a carry-on type agricultural machine such as a pesticide spray machine and a lawn mower.

For example, Patent Reference has disclosed a conventional internal combustion small engine. In the conventional internal combustion small engine, a piston is disposed inside a cylinder chamber to be slide therein reciprocally in a vertical direction. The cylinder chamber includes a cylinder gas inlet and a cylinder gas outlet. The cylinder gas inlet is provided for sucking a mixture gas of a fuel and an air into the cylinder chamber. The cylinder gas outlet is provided for exhausting a combustion gas generated when the mixture gas is combusted in the cylinder chamber.

Patent Reference: Japanese Patent Publication No. 2005-233087

In the conventional internal combustion small engine disclosed in Patent Reference, the mixture gas is sucked at the same time the combustion gas is exhausted. Accordingly, the cylinder gas inlet temporarily becomes a communicated state with the cylinder gas outlet through the cylinder chamber. As a result, a part of the mixture gas sucked through the cylinder gas inlet may pass through the cylinder chamber, and may be directly exhausted through the cylinder gas outlet. When the mixture gas is sucked from the cylinder gas inlet and directly exhausted through the cylinder gas outlet, an output and fuel efficiency of the conventional internal combustion small engine tend to be lowered.

In view of the problems described above, an object of the present invention is to provide an internal combustion engine capably of solving the problems of the conventional internal combustion engine.

Further objects and advantages of the invention will be apparent from the following description of the invention.

SUMMARY OF THE INVENTION

In order to attain the objects described above, according to a first aspect of the present invention, a method of producing an internal combustion engine includes the steps of: preparing a cylinder chamber having a cylinder gas inlet and a cylinder gas outlet; attaching an adjustment plate to the cylinder gas outlet; attaching an exhaustion pipe to the cylinder gas outlet with the adjustment plate in between; and disposing a piston inside the cylinder chamber.

According to the first aspect of the present invention, the adjustment plate has a through hole having an opening area smaller than that of the air cylinder gas outlet. Further, the adjustment plate is attached to the cylinder gas outlet so that a lower edge of the through hole of the adjustment plate is situated at a higher position relative to a lower edge of the cylinder gas outlet. Further, the piston is disposed inside the cylinder chamber so that an upper end surface of the piston is situated at a higher position relative to the lower edge of the cylinder gas outlet when the piston is situated at a bottom dead point.

According to a second aspect of the present invention, in the method of producing the internal combustion engine in the first aspect, the adjustment plate is attached to the cylinder gas outlet so that the lower edge of the through hole of the adjustment plate is situated at a higher position relative to a lower edge of the cylinder gas inlet.

According to a third aspect of the present invention, in the method of producing the internal combustion engine in the first aspect, the piston is disposed inside the cylinder chamber so that the lower edge of the through hole of the adjustment plate is situated at a higher position relative to the upper end surface of the piston when the piston is situated at the bottom dead point.

According to a fourth aspect of the present invention, an internal combustion engine includes a cylinder chamber having a cylinder gas inlet and a cylinder gas outlet; an adjustment plate attached to the cylinder gas outlet; an exhaustion pipe attached to the cylinder gas outlet with the adjustment plate in between; and a piston disposed inside the cylinder chamber.

According to the fourth aspect of the present invention, the adjustment plate has a through hole having an opening area smaller than that of the air cylinder gas outlet. Further, the adjustment plate is attached to the cylinder gas outlet so that a lower edge of the through hole of the adjustment plate is situated at a higher position relative to a lower edge of the cylinder gas outlet. Further, the piston is disposed inside the cylinder chamber so that an upper end surface of the piston is situated at a higher position relative to the lower edge of the cylinder gas outlet when the piston is situated at a bottom dead point.

As described above, according to the first aspect of the present invention, the method of producing the internal combustion engine includes the steps of: preparing the cylinder chamber having the cylinder gas inlet and the cylinder gas outlet; attaching the adjustment plate to the cylinder gas outlet; attaching the exhaustion pipe to the cylinder gas outlet with the adjustment plate in between; and disposing the piston inside the cylinder chamber.

Further, according to the first aspect of the present invention, the adjustment plate has the through hole having the opening area smaller than that of the air cylinder gas outlet. Further, the adjustment plate is attached to the cylinder gas outlet, so that the lower edge of the through hole of the adjustment plate is situated at the higher position relative to the lower edge of the cylinder gas outlet. Accordingly, it is possible to prevent an air flow from the cylinder gas inlet to the cylinder gas outlet passing over the upper end surface of the piston with the lower edge of the through hole of the adjustment plate. As a result, it is possible to prevent a mixture gas sucked into the cylinder chamber from directly being exhausted from the cylinder gas outlet when a combustion gas is exhausted, thereby improving an output and fuel efficiency of the internal combustion engine.

Further, according to the second aspect of the present invention, the adjustment plate is attached to the cylinder gas outlet, so that the lower edge of the through hole of the adjustment plate is situated at the higher position relative to the lower edge of the cylinder gas inlet. Accordingly, it is possible to prevent the mixture gas sucked into the cylinder chamber from directly being exhausted from the cylinder gas outlet when the combustion gas is exhausted, thereby improving the output and the fuel efficiency of the internal combustion engine.

DETAILED DESCRIPTION OF PREFERRED EMBODIMENTS

Figure 1:
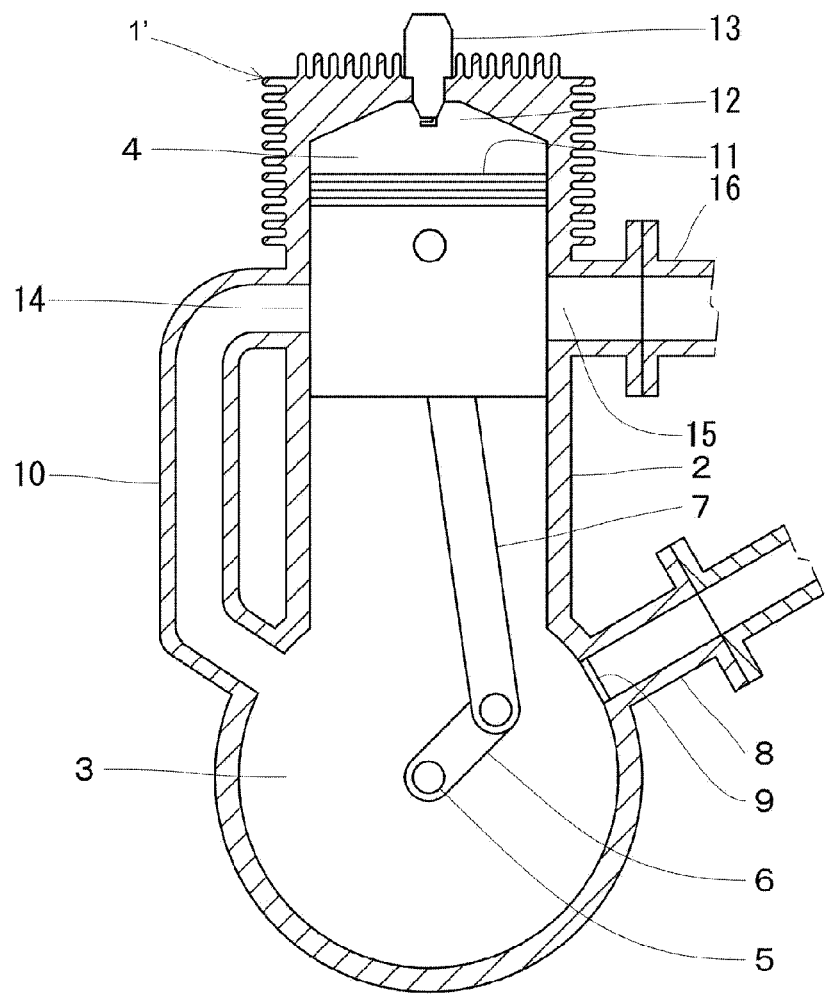
FIG. 1 is a schematic sectional view showing a conventional internal combustion engine.
Figure 2:
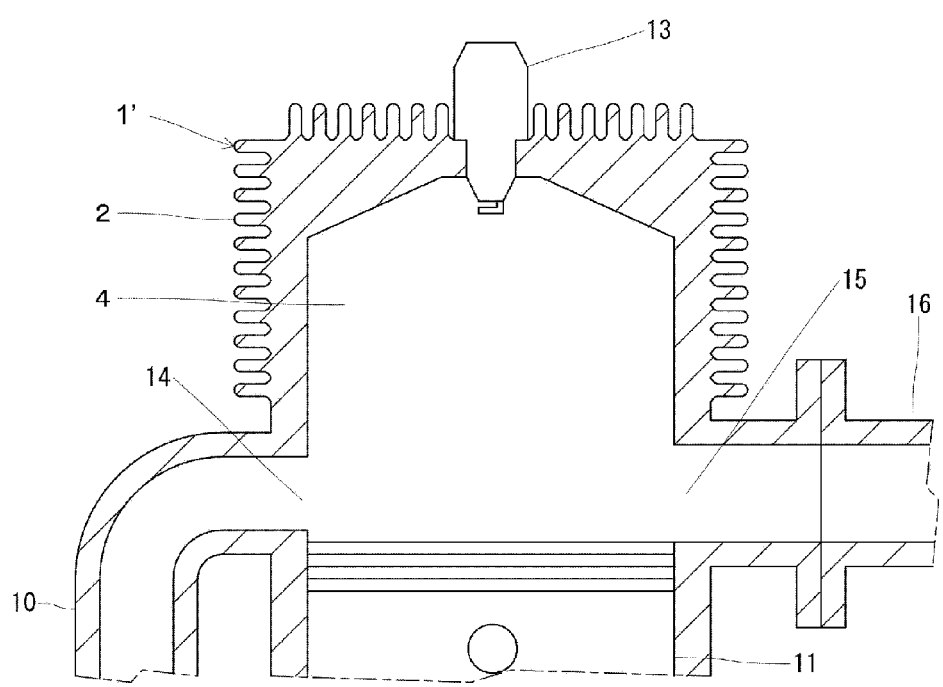
FIG. 2 is a schematic enlarged sectional view showing the conventional internal combustion engine.

An embodiment of the present invention will be described with reference to the accompanying drawings. As a comparison, a conventional internal combustion engine 1' will be explained first. FIG. 1 is a schematic sectional view showing the conventional internal combustion engine 1'. FIG. 2 is a schematic enlarged sectional view showing the conventional internal combustion engine 1'.

As shown in FIG. 1, the conventional internal combustion engine 1' includes a casing 2 and a crank chamber 3 arranged inside the casing 2 at a lower portion thereof. Further, the conventional internal combustion engine 1' includes a cylinder chamber 4 arranged inside the casing 2 at an upper portion thereof.

In the conventional internal combustion engine 1', the crank chamber 3 retains an output shaft 5, a crank 6 having a base portion connected to the output shaft 5, and a rod 7 having a base portion connected to a distal end portion of the crank 6.

In the conventional internal combustion engine 1', the crank chamber 3 is connected to an air inlet pipe 8 through an open and close valve 9 for sucking a mixture gas of a fuel and an air. Further, the crank chamber 3 is connected to a supply pipe 10 at a base portion thereof for supplying the mixture gas to the cylinder chamber 4.

In the conventional internal combustion engine 1', the cylinder chamber 4 retains a piston 11 therein, so that the piston 11 can slide up and down inside the cylinder chamber 4. A distal end portion of the rod 7 is connected to the piston 11.

In the conventional internal combustion engine 1', the cylinder chamber 4 includes a combustion chamber 12 above an upper end surface of the piston 11 when the piston 11 is situated at an upper dead point. An ignition plug 13 is disposed inside the combustion chamber 12, so that the mixture gas is combusted in the combustion chamber 12.

In the conventional internal combustion engine 1', the cylinder chamber 4 further includes a cylinder air inlet 14 for sucking the mixture gas and a cylinder air outlet 15 for exhausting a combustion gas generated through combusting the mixture gas. The cylinder air inlet 14 is formed at a position above the upper end surface of the piston 11 when the piston 11 is situated at a bottom dead point, and is situated to face the cylinder air outlet 15. A distal end portion of the supply pipe 10 is connected to the cylinder air inlet 14. A base portion of an exhaustion pipe 16 is detachably attached to the cylinder air outlet 15.

In the conventional internal combustion engine 1', when the mixture gas is combusted inside the cylinder chamber 4 (the combustion chamber 12), the piston 11 is pushed down, and the combustion gas is exhausted from the cylinder air outlet 15 into the exhaustion pipe 16. At the same time, the mixture gas is sucked from the cylinder air inlet 14 into the cylinder chamber 4.

In the conventional internal combustion engine 1', as shown in FIG. 2, when the piston 11 is pushed down to the bottom dead point, the upper end surface of the piston 11 is situated slightly below a lower edge of the cylinder air inlet 14. Further, the upper end surface of the piston 11 is situated at a same level as a lower edge of the cylinder air outlet 15.

Accordingly, when the combustion gas is exhausted and the mixture gas is sucked from the cylinder air inlet 14 into the cylinder chamber 4, a part of the mixture gas passes above the upper end surface of the piston 11 and is exhausted directly from the cylinder air outlet 15. As a result, an output and fuel efficiency of the conventional internal combustion engine 1' tends to be lowered.

Figure 3:
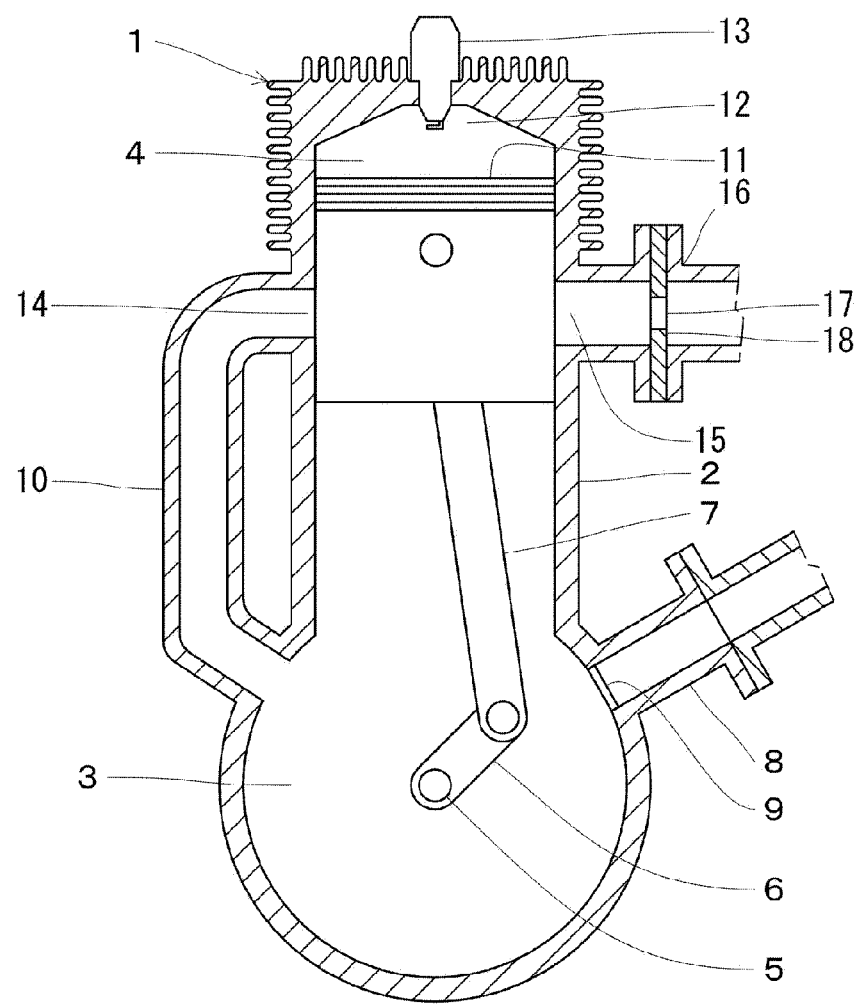
FIG. 3 is a schematic sectional view showing an internal combustion engine according to the embodiment of the present invention.
Figure 4:
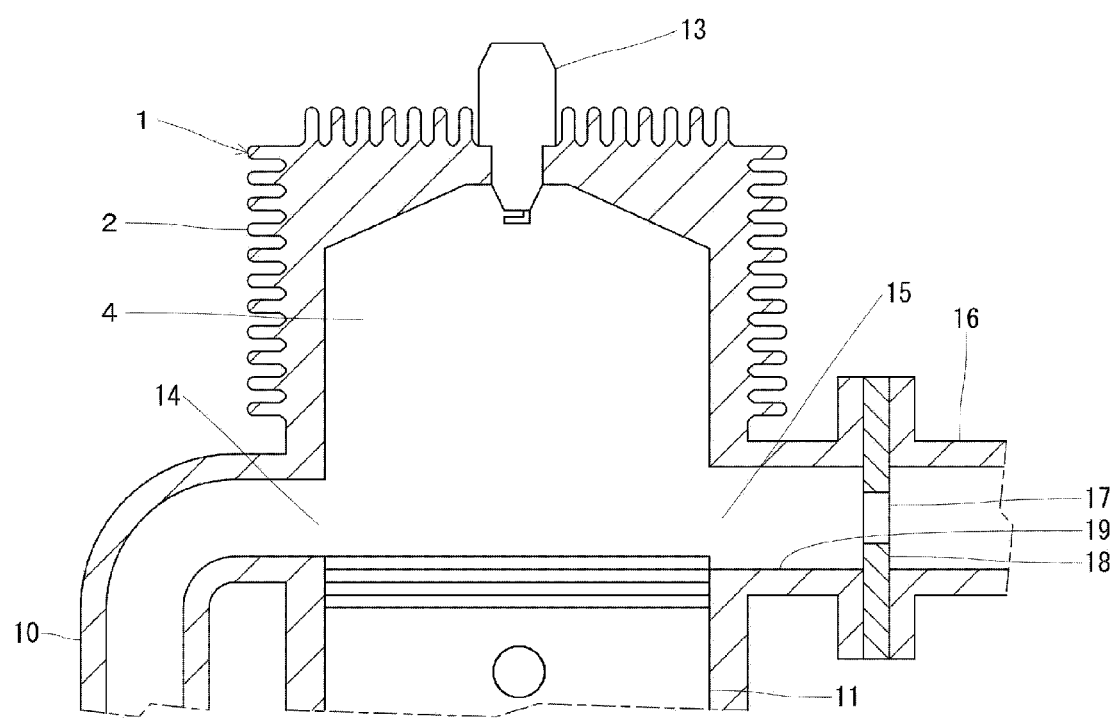
FIG. 4 is a schematic enlarged sectional view showing the internal combustion engine according to the embodiment of the present invention.

To this end, according to the embodiment of the present invention, an internal combustion engine 1 has the following configuration. FIG. 3 is a schematic sectional view showing the internal combustion engine 1 according to the embodiment of the present invention. FIG. 4 is a schematic enlarged sectional view showing the internal combustion engine 1 according to the embodiment of the present invention.

As shown in FIGS. 3 and 4, the internal combustion engine 1 includes an adjustment plate 18 having a rectangular shape disposed between the cylinder air outlet 15 and the exhaustion pipe 16. The adjustment plate 18 has a through hole 17 having an opening area smaller than that of the cylinder air outlet 15. The adjustment plate 18 may be attached to the cylinder air outlet 15 after the exhaustion pipe 16 is detached from the cylinder air outlet 15 of the conventional internal combustion engine 1'.

In the embodiment, the adjustment plate 18 is disposed between the cylinder air outlet 15 and the exhaustion pipe 16 such that a lower edge of the through hole 17 is situated at a position above the lower edge of the cylinder air outlet 15.

In the internal combustion engine 1 in the embodiment, the opening portion of the cylinder air outlet 15 is restricted with the through hole 17 of the adjustment plate 18. In other words, the through hole 17 of the adjustment plate 18 restricts the gas flow from the cylinder air inlet 14 into the cylinder air outlet 15 above the upper end surface of the piston 11. Accordingly, when the combustion gas is exhausted and the mixture gas is sucked from the cylinder air inlet 14 into the cylinder chamber 4, it is possible to prevent a part of the mixture gas from directly being exhausted from the cylinder air outlet 15. As a result, it is possible to improve the output and fuel efficiency of the internal combustion engine 1.

Further, in the embodiment, the adjustment plate 18 may be disposed between the cylinder air outlet 15 and the exhaustion pipe 16 such that the lower edge of the through hole 17 is situated at a position above the lower edge of the cylinder air inlet 14. Accordingly, when the combustion gas is exhausted and the mixture gas is sucked from the cylinder air inlet 14 into the cylinder chamber 4, it is possible to prevent a part of the mixture gas from directly being exhausted from the cylinder air outlet 15. As a result, it is possible to improve the output and fuel efficiency of the internal combustion engine 1.

Further, in the embodiment, the adjustment plate 18 may be disposed between the cylinder air outlet 15 and the exhaustion pipe 16 such that the lower edge of the through hole 17 is situated at a position above the upper end surface of the piston 11 when the piston 11 is situated at the bottom dead point.

Accordingly, when the combustion gas is exhausted and the mixture gas is sucked from the cylinder air inlet 14 into the cylinder chamber 4, it is possible to prevent a part of the mixture gas from directly being exhausted from the cylinder air outlet 15. As a result, it is possible to improve the output and fuel efficiency of the internal combustion engine 1.

Further, in the embodiment, the length and the attachment position of the rod 7 may be adjusted such that the upper end surface of the piston 11 is situated at a position above the lower edge of the through hole 17 when the piston 11 is situated at the bottom dead point. With the configuration, an air pocket 19 having a recessed shape is formed between the piston 11 and the adjustment plate 18 at a lower end portion of the cylinder air outlet 15. Accordingly, in addition to the lower edge of the through hole 17 of the adjustment plate 18, the air pocket 19 restricts the air flow from the cylinder air inlet 14 to the cylinder air outlet 15 above the upper end surface of the piston 11.

Accordingly, when the combustion gas is exhausted and the mixture gas is sucked from the cylinder air inlet 14 into the cylinder chamber 4, it is possible to prevent a part of the mixture gas from directly being exhausted from the cylinder air outlet 15. As a result, it is possible to improve the output and fuel efficiency of the internal combustion engine 1.

While the invention has been explained with reference to the specific embodiments of the invention, the explanation is illustrative and the invention is limited only by the appended claims.

What is claimed is:

1. An internal combustion engine, comprising:
   a cylinder chamber having a cylinder gas inlet and a cylinder gas outlet, said cylinder gas outlet being formed in a straight cylindrical shape;
   an adjustment plate attached to the cylinder gas outlet;
   an exhaustion pipe attached to the cylinder gas outlet with the adjustment plate in between, said exhaustion pipe being formed in a straight cylindrical shape so that a lower portion of the cylinder gas outlet is aligned on a straight line with a lower portion of the exhaustion pipe; and
   a piston disposed inside the cylinder chamber,
   wherein said adjustment plate has a through hole having an opening area smaller than that of the air cylinder gas outlet,
   said adjustment plate is attached to the cylinder gas outlet so that a lower edge of the through hole of the adjustment plate is situated at a higher position relative to a lower edge of the cylinder gas outlet,
   said piston is disposed inside the cylinder chamber so that an upper end surface of the piston is situated at a higher position relative to the lower edge of the cylinder gas outlet when the piston is situated at a bottom dead point.

2. The internal combustion engine according to claim 1, wherein said adjustment plate is attached to the cylinder gas outlet so that the lower edge of the through hole of the adjustment plate is situated at a higher position relative to a lower edge of the cylinder gas inlet.

3. The internal combustion engine according to claim 1, wherein said piston is disposed inside the cylinder chamber so that the lower edge of the through hole of the adjustment plate is situated at a higher position relative to the upper end surface of the piston when the piston is situated at the bottom dead point.

4. The internal combustion engine according to claim 1, wherein said cylinder gas inlet is situated at a position opposite to that of the cylinder gas outlet.

5. A method of producing an internal combustion engine comprising the steps of:
   preparing a cylinder chamber having a cylinder gas inlet and a cylinder gas outlet, said cylinder gas outlet being formed in a straight cylindrical shape;
   attaching an adjustment plate to the cylinder gas outlet, said adjustment plate having a through hole having an opening area smaller than that of the air cylinder gas outlet;
   attaching an exhaustion pipe to the cylinder gas outlet with the adjustment plate in between, said exhaustion pipe being formed in a straight cylindrical shape so that a lower portion of the cylinder gas outlet is aligned on a straight line with a lower portion of the exhaustion pipe; and
   disposing a piston inside the cylinder chamber,
   wherein said adjustment plate is attached to the cylinder gas outlet so that a lower edge of the through hole of the adjustment plate is situated at a higher position relative to a lower edge of the cylinder gas outlet,
   said piston is disposed inside the cylinder chamber so that an upper end surface of the piston is situated at a higher position relative to the lower edge of the cylinder gas outlet when the piston is situated at a bottom dead point.

6. The method of producing the internal combustion engine according to claim 5, wherein said adjustment plate is attached to the cylinder gas outlet so that the lower edge of the through hole of the adjustment plate is situated at a higher position relative to a lower edge of the cylinder gas inlet.

7. The method of producing the internal combustion engine according to claim 5, wherein said piston is disposed inside the cylinder chamber so that the lower edge of the through hole of the adjustment plate is situated at a higher position relative to the upper end surface of the piston when the piston is situated at the bottom dead point.

8. The method of producing the internal combustion engine according to claim 5, wherein said cylinder gas inlet is situated at a position opposite to that of the cylinder gas outlet.

\* \* \* \* \*